W. H. WEBB, W. G. BRETTELL & A. J. ADAMSON.
APPARATUS FOR AIR MOISTENING.
APPLICATION FILED AUG. 17, 1907.
943,638.
Patented Dec. 14, 1909.
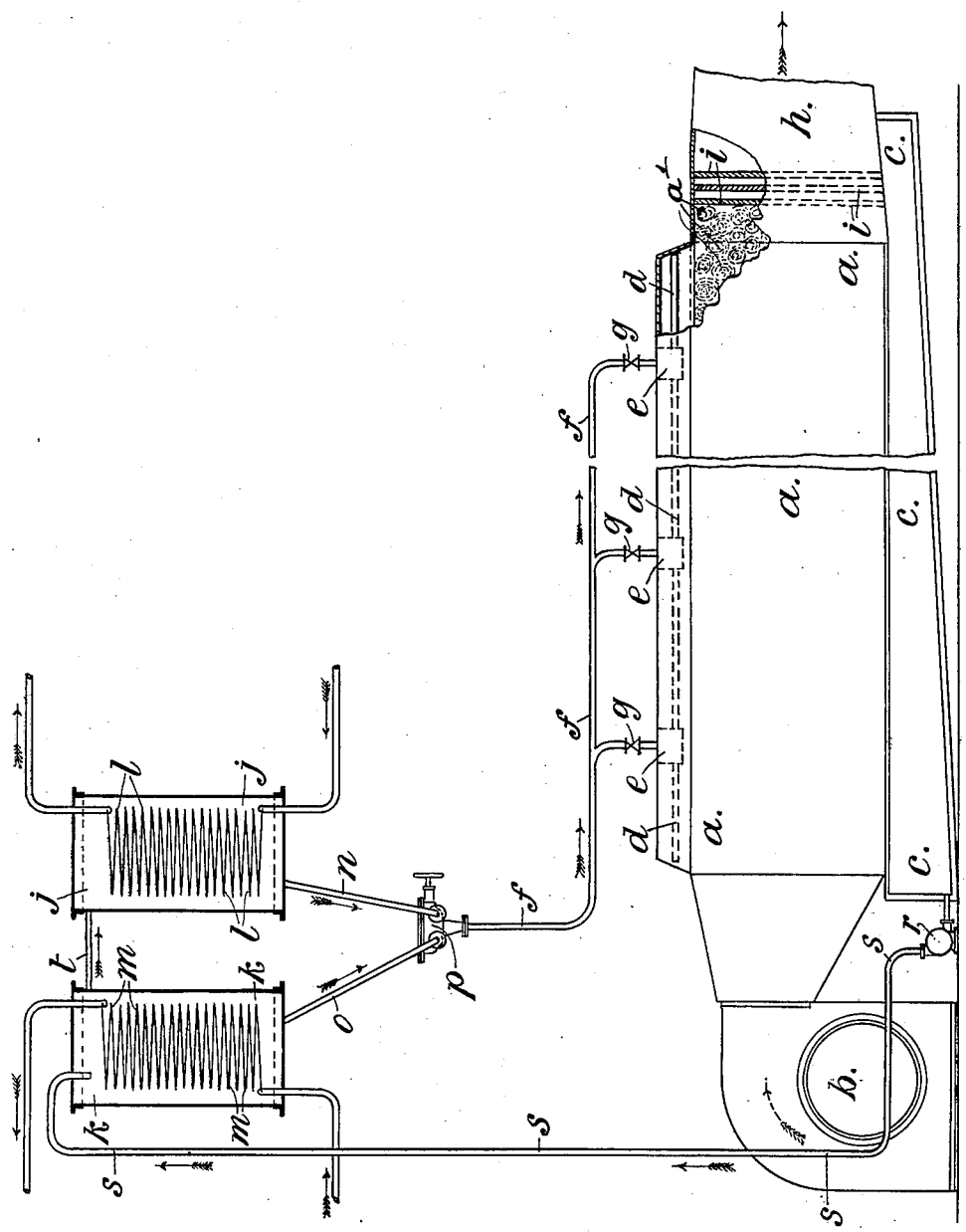

UNITED STATES PATENT OFFICE.

WALTER HENRY WEBB, WILLIAM GEORGE BRETTELL, AND ALEXANDER JOHN ADAMSON, OF LIVERPOOL, ENGLAND.

APPARATUS FOR AIR-MOISTENING.

943,638. Specification of Letters Patent. Patented Dec. 14, 1909.

Original application filed July 3, 1906, Serial No. 324,658. Divided and this application filed August 17, 1907. Serial No. 389,000.

*To all whom it may concern:*

Be it known that we, WALTER HENRY WEBB, WILLIAM GEORGE BRETTELL, and ALEXANDER JOHN ADAMSON, subjects of the King of England, residing at Liverpool, in the county of Lancaster, England, have invented new and useful Improvements in Apparatus for Air-Moistening, of which the following is a specification.

This invention has reference to apparatus used in plants for smelting, melting, or heating of metals, ores, or similar substances; but for convenience, it will be mainly described as applied to plants for smelting metallic ores, such for instance as iron ores, in smelting furnaces, for the extraction or manufacture of metallic iron therefrom.

The invention has for its object and effect, to provide means or apparatus for, supplying the air used in the combustion of the fuel in the furnace plant, at a regular or constant hydrometric condition and temperature, which is relatively simple, small, and inexpensive.

In carrying out processes of the kind referred to, having settled upon the temperature of air to be supplied to the furnace plant, say for example, air between 35° and 45° Fahr., the air supplied will be maintained at this temperature, when the outside atmosphere is below freezing point or cold, by warming or heating it; while when the outside atmosphere is higher than the desired temperature, and warm, as in summer, it is artificially cooled; and no matter what the hygrometric condition of the outside atmospheric air may be, it is always supplied fully, or approximately fully saturated, that is, fully, or approximately fully saturated at the temperature at which it is to be, and will be delivered, by submitting it—the air—to naked or actual contact with water of such a temperature as will bring the incoming atmospheric air, irrespectively of its temperature and degree of humidity, to the required constant temperature of air to be supplied, and the desired constant degree of humidity; that is in a saturated or approximately saturated condition at this temperature.

The word "saturation" is to be understood herein, and is employed in its wider meaning, that is, it is to be taken to describe that state or degree of humidity of air which would exist after it has been subjected to the influence of any particular species of heating or cooling liquid used, which it has either acted upon, or to which it has been subjected, it being well known that different liquids will produce different degrees of humidity in air acted upon or influenced by them, at a given temperature.

The apparatus according to this invention is illustrated diagrammatically in the annexed drawing, by which the rendering of the supply of air at a constant temperature and humidity, is accomplished. This apparatus consists of a chamber $a$ through which the air is passed on its way to the furnace, it being forced through it by a fan or blower $b$.

The chamber in the case shown is supplied with water or liquid at the top, and below is provided with a collecting trough $c$. The liquid is supplied at the upper part of the chamber $a$ through a series of perforated pipes $d$, arranged side by side, so as to well distribute the liquid over its upper area; the liquid being supplied or distributed to the several pipes by boxes $e$, in which they are fixed, and to which the liquid is supplied by a pipe $f$, having the regulating taps or cocks $g$ thereon. This chamber $a$ is filled with objects or a medium which will give an extensive surface, and onto such objects or medium the liquid is so distributed, as to produce and present to the air, a large wetted surface, and in such a way that the air passing along, would be made to so come in contact with it, that it will be readily brought to the humidity and temperature required. That is, it will take up from the tempering water or liquid, or give out to it, heat and moisture readily and rapidly. The medium or objects by which this can be well accomplished, is by the use of hurdles $a'$ of wood, or brushwood, such as are used for sheep-folds, and the like, or faggots, with which the chamber would be suitably filled and packed; but any similar material or objects providing a suitable and extensive surface, with spaces or interstices for the flow of air past and over it may be employed. On to these objects or surface-giving medium, the liquid from the distribution pipes $d$ will be sprayed or delivered, it being so delivered as to be effectually distributed over it, and so that the surfaces of the objects or medium throughout shall be well and completely wetted, having a thin film of liquid over it; while the air supplied by the fan or blower e which passes longitudinally over it, will be made to come in contact with this distributed wetted surface (that is the liquid adhering more or less upon the surfaces), meeting in its longitudinal flow and checkered course, a somewhat obstructed passage, the object and effect of which is to provide the best manner of bringing the air into intimate contact with the water for giving it readily, and within a small space, the required temperature, and producing in it the required humidity (at the same time preventing the air as far as possible, taking up and carrying with it, moisture in suspension), so rendering a plant of a given size of the highest efficiency, and of relatively small cost.

At the outlet h of the chamber a, there are a series of baffles i, such as louver boards, or checker-work, or surfaces of any suitable kind, which the air will strike in passing to the outlet, and by means of which, it will be caused by the impact, to deposit any surplus moisture it may carry, that is, free moisture which is not properly absorbed in a vaporous or combined form in it.

The water or liquid heating and cooling apparatus are designated j and k, respectively; and they each consist of a vessel having a surface, say a pipe surface, within it. This pipe surface in the case shown, is in the form of a coil or coils l and m, in the vessels j and k, respectively, through which the heating and cooling fluids are passed; the coil l of course, being connected up with a source of hot fluid, say hot water or steam, and the coil m with a source of cold fluid, such as liquid refrigerating machinery. The liquid from these vessels j, k, is taken by pipes n and o to an apparatus p, to which the flow from one or other, or both of the vessels is or are supplied, they being regulated by suitable taps or cocks; and from this apparatus the liquid is conveyed by the single pipe f, as above described, to the liquid distributing boxes or chambers e and pipes d. Sometimes warm liquid alone will be supplied to the chamber a and sometimes cold liquid alone will be supplied to it, while sometimes, to obtain the required temperature,—especially if the temperature of the heating and cooling fluids in the coils l, m, for the time being, be fairly constant—a mixture of both the hot and cold liquids in the requisite proportions, will be supplied by the respective pipes n, o, to the apparatus p, which then becomes a mixing apparatus.

It is advantageous to employ a temperature of the air supply which is above freezing-point, say, about 40 degrees Fahr., or approximately this temperature, as, by so doing, plain water may be employed as the heating or cooling fluid for giving the air the required temperature, and so obviating the use of brine or similar fluid which would be used, if temperatures materially below freezing-points were used, and which, if used, would become weak or concentrated by contact action of the air, entailing thereby expense and complications for rectifying its strength, and also avoiding the formation of snow or ice in the apparatus.

The water in the vessel l may be heated up to, say, about 70 degrees Fahr., in most cases; while that in the vessel k may be kept about a few degrees above freezing-point. Then, according to the temperature of the water required to be supplied to the chamber a, for bringing the air to be delivered to the furnace plant to the required humidity and temperature, water from the cool tank, or water from the warm tank, or from both in certain proportions, is drawn off and supplied to the distributing tanks or chambers e and conduits d of the chamber a. The water from the tank c is returned to the cold water vessel k by a pump r and pipe s; and the warm water vessel j is supplied from the cold water vessel k, which is conveniently done by an overflow pipe t connecting the upper parts of these vessels. In some cases, if desired for special reasons, or otherwise, in an installation of a plant of the character herein set forth, the warming and cooling or tempering of the air may be effected by a "surface" heat interchanger, in lieu of the naked liquid contact one herein more particularly specified; a suitable known mode or means of supplying moisture to the air at times when it is below the degree of humidity required, being provided.

By using a thermometer, or otherwise, the temperature of the air supplied from the chamber a can be observed; and by regulating and controlling the supply of cooler and warmer waters to the chamber, either by hand, or automatic regulation of any suitable kind, the air may be brought to a constant temperature, and in consequence of a constant degree of humidity, and supplied to the furnace plant in that condition. The air from the chamber a will be delivered to the furnace by the air moving or forcing engines or apparatus employed. According to the pressure of air required, and other circumstances and conditions of the application of the invention, will depend the point of the plant at which the said air forcing engines or apparatus will be placed, and the manner of supplying the air.

What is claimed is:—

1. In apparatus for attempering air and saturating it with moisture, a structure filled chamber, means for supplying artificially heated and cooled water at the same time to the structures in the chamber, means for heating and cooling the water, a fan for blowing air through the chamber, baffles for removing the suspended moisture from the moisture saturated and attempered air, and means for removing the collected moisture from the baffles.

2. In apparatus for attempering air and saturating it with moisture, a structure filled chamber, means for enabling warm and cold liquid to flow over the structures in the chamber, a tank for holding the liquid to be heated, a coil contained in the heating tank for the passage of a heating medium, a tank for holding the liquid to be cooled, a coil contained in the cooling tank for the passage of a cooling medium, a mixing chamber connected with the heating and cooling tanks and the structure filled chamber, a fan for blowing air through the structure filled chamber, and means for removing suspended moisture, in the form of spray, from the attempered and moisture saturated air.

3. The apparatus for attempering air and saturating it with moisture for furnace plant, comprising a chamber filled with wooden framework structures, a tank for holding the liquid to be heated, a coil contained in the heating tank for the passage of the heating medium, a tank for holding the liquid to be cooled, a coil contained in the cooling tank for the passage of a cooling medium, a mixing chamber connected with the heating and cooling tanks and the structure filled chamber, pipes for conveying the attempered water directly to the surface of the structures, a fan for blowing air through the chamber and structures, vertical or nearly vertical baffles for removing the suspended liquid, in the form of spray, from the attempered and moisture saturated air, a collecting trough for receiving from the baffles the suspended liquid removed by the baffles, and a pump for returning the removed liquid to the said tanks.

In testimony whereof we have signed our names to this specification in the presence of two subscribing witnesses.

WALTER HENRY WEBB.
WILLIAM GEORGE BRETTELL.
ALEXANDER JOHN ADAMSON.

Witnesses:
  ERNEST R. ROYDTON,
  FRANK E. FLEETWOOD.